Jan. 11, 1955     W. E. JAEGER     2,699,104
IMPLEMENT SWEEP
Filed May 17, 1954
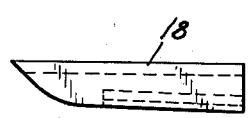
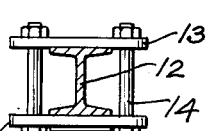
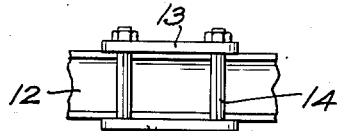
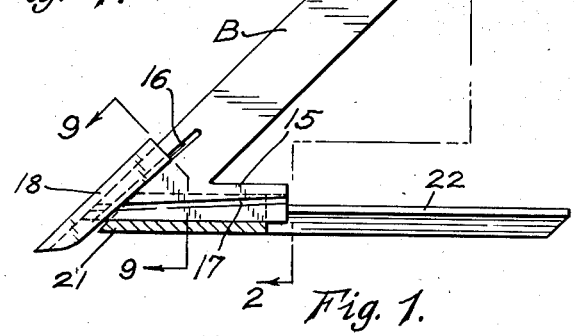
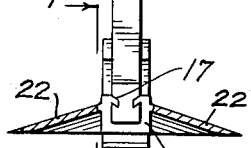
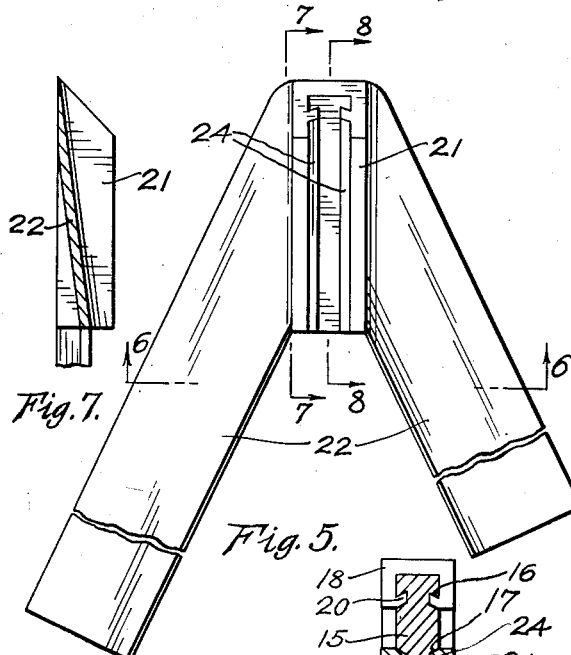
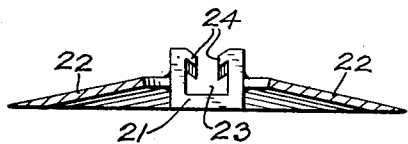
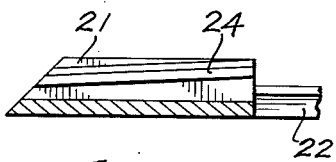
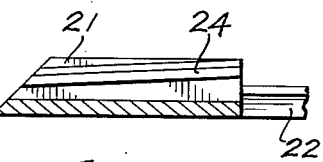
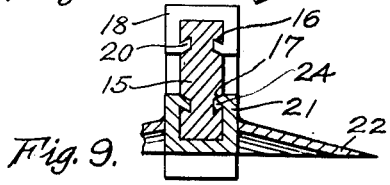
INVENTOR.
WAYNE E. JAEGER
BY
Martin E. Anderson
ATTORNEY United States Patent Office 2,699,104
Patented Jan. 11, 1955

2,699,104
IMPLEMENT SWEEP
Wayne E. Jaeger, Imperial, Nebr.

Application May 17, 1954, Serial No. 430,209

1 Claim. (Cl. 97—205)

This invention relates to improvements in implement sweeps.

In parts of the country where cereals are the main crop and more particularly where wheat is grown, it has been found that it is not essential to turn the soil by means of a conventional plow and that if the top layer is broken so that water and air can penetrate it the chemical and bacteriological changes necessary for optimum plant growth will take place about as well as if the soil had been turned by a plow.

Machines for the purpose of breaking the upper soil layer employ sweeps that are sometimes referred to as "Duck feet." Such sweeps comprise a chisel blade and a V-shaped cutter whose blades are rearwardly ranging so that in addition to cutting the upper soil layer loose, lift it sufficiently to cause it to crack thus leaving it in a cracked condition that permits water and air to readily penetrate. In semi-arid regions any rain that falls will penetrate the cracks in the broken top layer instead of merely wetting the upper surface and produce a run-off that results in erosion.

The chisel and the V-blades must be removed from time to time for sharpening and to adjust the position of the chisel and it has heretofore been the practice to employ bolts for securing the parts to the plow standard or shank. It has been found that this way of effecting attachment of the chisel and V-blades is objectionable because the holes fill with dirt and the bolts rust, making it difficult to remove, adjust and replace the chisel and V-blade.

It is the principal object of this invention to produce an implement sweep of such a construction and design that the chisel and the V-blades can be attached to and removed from the standard or shank without the employment of bolts or pins and thus make the removal and replacement easier.

Having thus in a general way described the invention and its objects, the invention will now be described in detail for which purpose reference will be had to the accompanying drawing in which, Figure 1 is a side elevational view with one of the V-blades shown in section, taken on line 1—1, Figure 2;

Figure 2 is a rear elevational view looking in the direction of arrows 2—2, Figure 1, the V-blades being shown in section;

Figure 3 is a side elevational view of the chisel; Figure 4 is an end view of the chisel looking in the direction of arrow 4 in Figure 3;

Figure 5 is a top plan view of the V-blades showing the same removed from the standard or shank;

Figure 6 is a section taken on line 6—6, Figure 5;
Figure 7 is a section taken on line 7—7, Figure 5;
Figure 8 is a section taken on line 8—8, Figure 5; and
Figure 9 is a section taken on line 9—9, Figure 1.

Referring now to the drawing, reference numeral 10 represents the plow standard or shank which is provided at its upper end with a flat plate 11 that rests against the bottom of I-beam 12. A plate 13 is attached to plate 11 by bolts 14 which serve to clamp the standard to beam 12. Standard 10 is formed with two angularly related sections A and B. Section B terminates at its lower end in a foot having a rearwardly projecting heel 15. The lower end of section B has opposite sides provided with grooves 16 that are upwardly inclined and slant rearwardly from the front edge as shown in Figure 1. The heel 15 is provided on opposite sides with grooves 17. A chisel 18 has an opening 19 partly closed by flanges or ribs 20 that extend into grooves 16 as shown in Figures 1 and 9 and is attached to the plow standard by inserting the lower end of section B into opening 19 and driving the chisel upwardly. The wedge action due to the fact that grooves 16 slant back from the front surface of B holds the chisel securely in place. The V-blade assembly shown in Figures 1, 2, 5 and 6 consists of a central body 21 to which the front ends of blade 22 are welded. The central body portion 21 has an opening 23 with inwardly extending flanges 24 that project into grooves 17. The V-blade assembly is attached to the plow standard before the chisel is attached and the foot portion is inserted into opening 23 with the ribs 24 projecting into grooves 17 and after the blade assembly is in position the chisel is put into place, as shown in Figure 1, and positively prevents the blade assembly from being removed either accidentally or otherwise as long as the chisel is in place.

When the chisel is to be removed it is subjected to a series of hammer blows at its upper end, of sufficient intensity to loosen it after which the V-blade assembly can be removed in a similar manner.

From the above it will be apparent that the chisel and the V-blade assembly are secured to the plow standard without the use of bolts or pins, as has been the usual practice heretofore. After the blades and the chisel are in place they are held firmly because they do not depend on the clamping action of bolts or set screws. When the chisel is worn until it fails to project as far down as desired, it is removed and replaced by another or lengthened and sharpened and then replaced.

What I claim as new is:

An implement sweep for use with a ground working machine having a tool support beam; comprising a plow standard having two angularly related sections one of which terminates in means for effecting a readily releasable connection with the tool support beam, the other section being downwardly and forwardly ranging and terminates at its lower end in a foot having a rearwardly extending heel, the sides of the foot and heel portion having grooves that are rearwardly and upwardly inclined with respect to the sole of the foot, a V-blade assembly comprising an elongated central body portion to the sides of which the front ends of rearwardly flaring blades are attached, the body portion having a longttudinally extending opening of a size and shape to receive that portion of the foot between the sole and the grooves, the side walls of the opening in the body portion having inwardly extending ribs positioned to enter the grooves, the lower portion of the lower section having its sides provided with grooves extending from the sole of the foot upwardly adjacent the front side of the standard and rearwardly ranging relative to the front side, and a chisel point provided with a longitudinal opening adapted to receive that part of the standard between the front side and the grooves, the side walls of the opening in the chisel point having ribs positioned to engage in the last mentioned grooves to hold the chisel point in place.

References Cited in the file of this patent

UNITED STATES PATENTS

| Re. 3,616 | Murfee | Aug. 24, 1869 |
| 468,300 | Brown | Feb. 2, 1892 |
| 2,083,083 | Nielsen | June 8, 1937 |
| 2,222,071 | Gustafson | Nov. 19, 1940 |
| 2,325,991 | White | Aug. 3, 1943 |
| 2,469,044 | Lane | May 3, 1949 |